United States Patent
Lee et al.

(10) Patent No.: US 10,096,841 B2
(45) Date of Patent: Oct. 9, 2018

(54) CATALYST CARRIER, METHOD FOR PRODUCING CATALYST CARRIER, AND USE OF CATALYST CARRIER

(71) Applicant: SHOWA DENKO K.K., Tokyo (JP)

(72) Inventors: Kunchan Lee, Tokyo (JP); Hiroshi Takahashi, Tokyo (JP); Tomoya Kitagawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/537,907

(22) PCT Filed: Dec. 24, 2015

(86) PCT No.: PCT/JP2015/085987
§ 371 (c)(1),
(2) Date: Jun. 20, 2017

(87) PCT Pub. No.: WO2016/104587
PCT Pub. Date: Jun. 30, 2016

(65) Prior Publication Data
US 2017/0346101 A1  Nov. 30, 2017

(30) Foreign Application Priority Data
Dec. 25, 2014  (JP) .................... 2014-261669

(51) Int. Cl.
*H01M 4/96* (2006.01)
*H01M 4/90* (2006.01)
(Continued)

(52) U.S. Cl.
CPC .......... *H01M 4/9083* (2013.01); *B01J 21/18* (2013.01); *B01J 35/10* (2013.01); *B01J 37/04* (2013.01);
(Continued)

(58) Field of Classification Search
CPC ..................... H01M 4/9083; H01M 4/9016
See application file for complete search history.

(56) References Cited

U.S. PATENT DOCUMENTS
2002/0009626 A1   1/2002  Terazono et al.

FOREIGN PATENT DOCUMENTS
CN    102266785 A    12/2011
JP    2001-357857 A  12/2001
(Continued)

OTHER PUBLICATIONS

S. Zhang, L. Song / Catalysis Communications 10 (2009) 1725-1729.*
(Continued)

*Primary Examiner* — Olatunji Godo
(74) *Attorney, Agent, or Firm* — Sughrue Mion, PLLC

(57) ABSTRACT

A catalyst carrier, an electrode catalyst, an electrode including the catalyst, a membrane electrode assembly including the electrode, a fuel cell including the membrane electrode assembly, and a method for producing the catalyst carrier. The catalyst carrier includes a carbon material having a chain structure including a chain of carbon particles. The catalyst carrier contains a titanium compound-carbon composite particle in which carbon encloses a titanium compound particle. The molar ratios of a carbon element, a nitrogen element, and an oxygen element to a titanium element taken as 1 in the catalyst carrier are more than 0 and 50 or less, more than 0 and 2 or less, and more than 0 and 3 or less, respectively.

24 Claims, 2 Drawing Sheets

(51) Int. Cl.
*B01J 21/18* (2006.01)
*H01M 4/88* (2006.01)
*H01M 4/92* (2006.01)
*B01J 35/10* (2006.01)
*B01J 37/04* (2006.01)
*B01J 37/08* (2006.01)

(52) U.S. Cl.
CPC ............... *B01J 37/08* (2013.01); *H01M 4/88* (2013.01); *H01M 4/92* (2013.01); *H01M 4/96* (2013.01)

(56) References Cited

FOREIGN PATENT DOCUMENTS

| | | |
|---|---|---|
| JP | 2004-342505 A | 12/2004 |
| JP | 2007-257888 A | 10/2007 |
| JP | 2010-088981 A | 4/2010 |
| JP | 2013-020793 A | 1/2013 |
| JP | 2013-033701 A | 2/2013 |
| JP | 2015-195193 A | 11/2015 |

OTHER PUBLICATIONS

Written Opinion of the International Searching Authority for PCT/JP015/085987 dated Feb. 9, 2016 (5 pages).
Jianbing Zhu, et al., "The construction of nitrogen-doped graphitized carbon-$TiO_2$ composite to improve the electrocatalyst for methanol oxidation", Carbon, Jun. 2014, pp. 114-124, vol. 72.
International Search Report for PCT/JP2015/085987 dated Feb. 9, 2016 [PCT/ISA/210].

* cited by examiner

CATALYST CARRIER, METHOD FOR PRODUCING CATALYST CARRIER, AND USE OF CATALYST CARRIER

CROSS REFERENCE TO RELATED APPLICATIONS

This application is a National Stage of International Application No. PCT/JP2015/085987, filed on Dec. 24, 2015, which claims priority from Japanese Patent Application No. 2014-261669, filed on Dec. 25, 2014, the contents of all of which are incorporated herein by reference in their entirety.

TECHNICAL FIELD

The present invention relates to a catalyst carrier, an electrode catalyst, an electrode including the electrode catalyst, a membrane electrode assembly including the electrode, a fuel cell including the membrane electrode assembly, and a method for producing the catalyst carrier.

BACKGROUND ART

Electrode catalysts in which a catalyst metal containing platinum is supported on a carbon carrier have been mainly used for solid polymer fuel cells. However, carbon carriers that have been used as catalyst carriers are easily oxidized during high-potential operation such as start-stop operation of fuel cells. Therefore, for example, the supported catalyst metals aggregate and separate, which mainly causes the degradation of the performance of electrode catalysts.

In order to reduce the load of auxiliaries of fuel cell systems, a fuel cell is desirably operated while a low-humidification gas is supplied. However, if the fuel cell is operated under the low-humidification conditions, the proton conductivity of ionomers in an electrolyte membrane and a catalyst layer is degraded because of a dry-up phenomenon, which decreases the output of the fuel cell.

Patent Literature 1 discloses that, in order to improve the durability of carbon carriers during high-potential operation, the degree of crystallinity of carbon carriers is increased through heat treatment to suppress the oxidation of the carbon carriers during the operation of fuel cells. However, only the heat treatment of carbon carriers cannot achieve high oxidation resistance of carbon carriers during high-potential operation. In particular, it is difficult to prevent the degradation of the performance of fuel cells during operation under low-humidification conditions. Furthermore, if a carbon carrier having a high degree of graphitization is used, the corrosion resistance improves, but the specific surface area of the carbon carrier decreases, which degrades the power generation performance.

Patent Literature 2 discloses an electrode catalyst obtained by physically mixing a carbon carrier that supports a catalyst metal and an acidic oxide in order to improve the durability while maintaining high activity of a catalyst. However, the carbon carrier is highly hydrophobic and the acidic oxide is highly hydrophilic, and thus it is very difficult to physically mix such catalyst carriers having different physical properties in a uniform manner. The nonuniform physical mixing causes a variation in the catalytic performance and also causes, for example, unevenness and cracking during coating of a catalyst layer, which degrades the performance.

Patent Literature 3 discloses that a catalyst material containing hydrophilic particles of zeolite, titanium dioxide, or the like is used for an anode in order to maintain the cell performance to some degree during operation under low-humidification conditions. However, such a catalyst material does not exhibit electric conductivity, and thus the internal resistance of the catalyst layer is expected to increase.

Patent Literature 4 discloses a carbon material for carriers of fuel cells, the carbon material being obtained by mixing a moisture-retentive carbon material and carbon black. In this technique, the occlusion and release of water vapor by an activated carbon material can be expected to some degree. However, the water retention property is not sufficiently imparted to ionomers in an electrolyte membrane and a catalyst layer during the operation of a fuel cell under low-humidification conditions, and thus high cell output cannot be achieved. Furthermore, the carbon material is a carbon material into which micropores are introduced to impart the water retention property to the carbon material. Therefore, the carbon material is very easily oxidized during high-potential operation of fuel cells, which may degrade the durability.

CITATION LIST

Patent Literature

Patent Literature 1: JPA 2001-357857
Patent Literature 2: JPA 2013-33701
Patent Literature 3: JPA 2004-342505
Patent Literature 4: JPA 2013-20793

SUMMARY OF INVENTION

Technical Problem

It is an object of the present invention to provide a carrier that provides a catalyst whose performance degradation is small under low-humidification conditions and which exhibits high durability, an electrode catalyst, an electrode including the catalyst, a membrane electrode assembly including the electrode, a fuel cell including the membrane electrode assembly, and a method for producing the catalyst carrier.

Solution to Problem

The present invention includes the following inventions [1] to [24].
[1] A catalyst carrier includes a carbon material having a chain structure including a chain of carbon particles, wherein the catalyst carrier contains a titanium compound-carbon composite particle in which carbon encloses a titanium compound particle, and molar ratios of a carbon element, a nitrogen element, and an oxygen element to a titanium element taken as 1 in the catalyst carrier are more than 0 and 50 or less, more than 0 and 2 or less, and more than 0 and 3 or less, respectively.
[2] In the catalyst carrier according to [1], the catalyst carrier has a dibutyl phthalate absorption of 150 to 450 mL/100 g.
[3] In the catalyst carrier according to [1] or [2], a content of the titanium compound particle is 10 to 90 mass %.
[4] In the catalyst carrier according to any one of [1] to [3], the catalyst carrier has a BET specific surface area of 450 to 1100 $m^2$/g.
[5] In the catalyst carrier according to any one of [1] to [4], the titanium compound particle has an average particle size of 5 to 300 nm.
[6] In the catalyst carrier according to any one of [1] to [5], the carbon that encloses the titanium compound particle in the titanium compound-carbon composite particle is at least one carbon selected from amorphous carbon and graphitized carbon.

[7] In the catalyst carrier according to any one of [1] to [6], the carbon material is one selected from the group consisting of carbon black, graphitized carbon black, graphite, and porous carbon.

[8] In the catalyst carrier according to any one of [1] to [6], the carbon material is a mixture of two or more selected from the group consisting of carbon black, graphitized carbon black, graphite, and porous carbon.

[9] In the catalyst carrier according to any one of [1] to [8], the carbon material has a primary particle size of 5 to 300 nm.

[10] An electrode catalyst is obtained by allowing a catalyst metal particle to be supported on the catalyst carrier according to any one of [1] to [9].

[11] In the electrode catalyst according to [10], a metal of the catalyst metal particle is at least one metal selected from the group consisting of platinum, palladium, ruthenium, gold, rhodium, iridium, osmium, iron, cobalt, nickel, chromium, zinc, and tantalum, or an alloy formed of at least two metals selected from the foregoing group.

[12] In the electrode catalyst according to [10] or [11], the electrode catalyst has a BET specific surface area of 200 to 800 $m^2/g$.

[13] An electrode includes an electrode substrate and a catalyst layer containing the electrode catalyst according to any one of [10] to [12], the catalyst layer being formed on the electrode substrate.

[14] A membrane electrode assembly includes a cathode and an anode with an electrolyte membrane disposed therebetween, wherein at least one of the cathode and the anode is the electrode according to [13].

[15] A fuel cell includes the membrane electrode assembly according to [14].

[16] A method for producing the catalyst carrier according to any one of [1] to [9] includes a step of mixing a carbon material having a chain structure including a chain of carbon particles and a titanium compound-carbon composite particle in which carbon encloses a titanium compound particle, wherein ratios of a carbon element, a nitrogen element, and an oxygen element to a titanium element taken as 1 in the titanium compound-carbon composite particle are more than 0 and 7 or less, more than 0 and 2 or less, and more than 0 and 3 or less, respectively.

[17] In the method for producing a catalyst carrier according to [16], 0.1 to 10 parts by mass of the carbon material is mixed with 1 part by mass of the titanium compound-carbon composite particle.

[18] In the method for producing a catalyst carrier according to [16] or [17], the carbon material has a BET specific surface area of 700 to 1400 $m^2/g$.

[19] In the method for producing a catalyst carrier according to any one of [16] to [18], the carbon material has a dibutyl phthalate absorption of 350 to 550 mL/100 g.

[20] In the method for producing a catalyst carrier according to any one of [16] to [19], the carbon material has a crystallite size of 0.6 to 2.0 nm.

[21] In the method for producing a catalyst carrier according to [16] or [17], the carbon material is a mixture of a carbon material X having a BET specific surface area of 700 to 1400 $m^2/g$ and a carbon material Y having a BET specific surface area of 100 to 500 $m^2/g$.

[22] In the method for producing a catalyst carrier according to [21], the carbon material Y has a primary particle size of 5 to 300 nm and a crystallite size of 2.0 to 5.0 nm.

[23] In the method for producing a catalyst carrier according to any one of [16] to [22], the titanium compound-carbon composite particle is obtained by mixing polyvinylpyrrolidone and at least one compound selected from titanium oxycarbonitride, titanium oxynitride, and titanium oxide and heat-treating the mixture in a non-oxidizing gas atmosphere at 500° C. to 1100° C.

[24] In the method for producing a catalyst carrier according to any one of [16] to [23], the titanium compound particle has a BET specific surface area of 50 to 300 $m^2/g$.

Effects of Invention

The present invention provides a catalyst carrier that can provide a catalyst whose performance degradation is small during operation under low-humidification conditions and which can maintain high output. A fuel cell obtained by using the catalyst carrier has high durability against load fluctuation and start-stop operation.

DESCRIPTION OF EMBODIMENTS (Catalyst Carrier)

Figure 1:
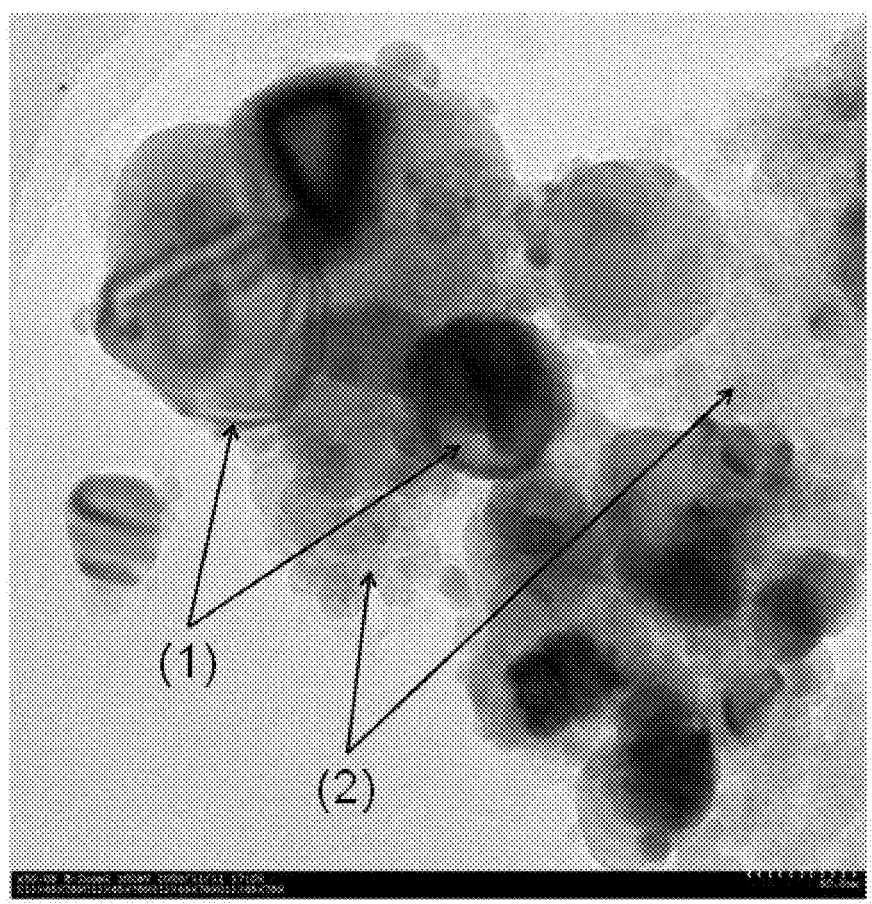
FIG. 1 is a transmission electron micrograph of carbon particles B(1) obtained in Example 1.

A catalyst carrier of the present invention includes a carbon material having a chain structure including a chain of carbon particles (hereafter, the carbon particles constituting the chain structure may be referred to as "carbon particles A"), and titanium compound-carbon composite particles (hereafter may be referred to as "carbon particles B") in which carbon encloses titanium compound particles (hereafter may be referred to as "titanium compound particles"). The molar ratios of a carbon element, a nitrogen element, and an oxygen element to a titanium element taken as 1 in the catalyst carrier are more than 0 and 50 or less, more than 0 and 2 or less, and more than 0 and 3 or less, respectively.

The BET specific surface area of the catalyst carrier is preferably 450 to 1100 $m^2/g$, more preferably 700 to 1100 $m^2/g$, and particularly preferably 900 to 1100 $m^2/g$ from the viewpoint of catalytic performance described later.

The dibutyl phthalate absorption (hereafter also referred to as a "DBP absorption") of the catalyst carrier is preferably 150 to 450 mL/100 g and more preferably 200 to 450 mL/100 g from the viewpoint of catalytic performance described later.

The content of the titanium compound particles in the catalyst carrier is preferably 10 to 90 mass %, more preferably 20 to 80 mass %, and particularly preferably 30 to 70 mass % from the viewpoint of catalytic performance described later. Herein, the entire amount of the catalyst carrier is assumed to be 100 mass %.

A titanium compound of the titanium compound particles preferably contains, as an element, carbon, nitrogen, and/or oxygen from the viewpoint of easily achieving high catalytic performance.

The average particle size of the titanium compound particles is preferably 5 to 300 nm, more preferably 5 to 200 nm, and particularly preferably 5 to 100 nm from the viewpoint of improving the durability and water retention property. The average particle size is an arithmetic mean of measured particle diameters of 50 or more titanium compound particles randomly chosen through observation with a transmission electron microscope.

The carbon that encloses the titanium compound particles is preferably at least one carbon selected from amorphous carbon and graphitized carbon. That is, the carbon may be highly amorphous carbon (amorphous carbon) or carbon with high degree of graphitization (graphitized carbon). Alternatively, these carbons may be mixed with each other. The carbon is preferably graphitized carbon from the viewpoint of further improving the durability and water retention property.

In the titanium compound-carbon composite particles, the molar ratio of a carbon element to a titanium element taken as 1 is preferably more than 0 and 7 or less and more preferably more than 0 and 5 or less. The molar ratio of a nitrogen element to a titanium element taken as 1 is preferably more than 0 and 2 or less and more preferably more than 0 and 1 or less. The molar ratio of an oxygen element to a titanium element taken as 1 is preferably more than 0 and 3 or less and more preferably more than 0 and 2 or less.

The carbon material is preferably one carbon material selected from the group consisting of carbon black, graphitized carbon black, graphite, and porous carbon. A method for producing graphitized carbon black will be described later.

The carbon material is also preferably a mixture of two or more selected from the group consisting of carbon black, graphitized carbon black, graphite, and porous carbon from the viewpoint of easily achieving high catalytic performance. The carbon material is more preferably a mixture of carbon black and graphitized carbon black.

Carbon black is constituted by carbon fine particles that are formed of amorphous carbon and have a chain structure. Carbon black is classified into, for example, furnace black, acetylene black, and thermal black in accordance with the production method thereof, and any of them can be used as a catalyst carrier. Carbon black has a sufficiently large specific surface area. When carbon black is contained in the catalyst carrier, high initial voltage is easily achieved.

Graphitized carbon black can be obtained by heat-treating commercially available carbon black in an inert or reducing gas atmosphere. Graphitized carbon black has a higher degree of graphitization than carbon black. When graphitized carbon black is contained in the catalyst carrier, high durability is easily achieved.

The carbon material is also preferably a mixture of two or more carbon materials. This will be described in detail in "Method for producing catalyst carrier".

Graphitized carbon black may have a microstructure in which graphite layers are stacked on top of each other in its carbon fine particles. When graphitized carbon black has a microstructure in which graphite layers are stacked on top of each other in its carbon fine particles, the number of layers in the layered structure is preferably 1 to 30 and more preferably 1 to 20. When the number of layers is within the range, the initial activity is high and high durability is easily achieved during start-stop operation. The number of layers is an arithmetic mean of the numbers of layers of layered structures in 50 graphitized carbon black randomly chosen through observation with a transmission electron microscope. It can also be confirmed from the degree of graphitization that graphitized carbon black has a microstructure in which graphite layers are stacked on top of each other in its carbon fine particles.

The primary particle size of the carbon material is preferably 5 to 300 nm, more preferably 5 to 100 nm, and particularly preferably 5 to 50 nm from the viewpoint of easily achieving high catalytic performance. The primary particle size is an arithmetic mean of measured particle diameters of 50 carbon particles A randomly chosen through observation of the carbon material with a transmission electron microscope.

(Method for Producing Catalyst Carrier)

A method for producing a catalyst carrier according to the present invention is not particularly limited as long as the above-described catalyst carrier is obtained. The method for producing a catalyst carrier according to the present invention includes, for example, a step (hereafter may be referred to as a "(c) step") of mixing a carbon material having a chain structure including a chain of carbon particles and titanium compound-carbon composite particles (carbon particles B) in which carbon encloses titanium compound particles. The ratios of a carbon element, a nitrogen element, and an oxygen element to a titanium element taken as 1 in the titanium compound-carbon composite particles are more than 0 and 7 or less, more than 0 and 2 or less, and more than 0 and 3 or less.

The method for producing a catalyst according to the present invention may also include, before the (c) step, (a) a step of mixing at least one compound (hereafter may be referred to as a "raw material compound") selected from titanium oxycarbonitride, titanium oxynitride, and titanium oxide and polyvinylpyrrolidone to obtain a mixture and (b) a step of heat-treating the mixture in a non-oxidizing gas atmosphere at 500° C. to 1100° C. to obtain titanium compound-carbon composite particles. The titanium compound-carbon composite particles obtained through the (a) step and the (b) step are titanium compound-carbon composite particles in which carbon encloses titanium compound particles containing carbon, nitrogen, and oxygen. In this case, the titanium compound-carbon composite particles in which carbon encloses titanium compound particles containing carbon, nitrogen, and oxygen are used as the carbon particles B, and the catalyst carrier can be produced by mixing the titanium compound-carbon composite particles with the carbon material having a chain structure including a chain of carbon particles.

It is normally difficult to uniformly mix a carbon material such as hydrophobic conductive carbon particles and hydrophilic particles such as titanium compound particles. However, the titanium compound particles used in the present invention are enclosed by carbon, and thus they are easily mixed with each other in a uniform manner. Therefore, normally, only about 10 minutes to 10 hours are required for the mixing time of the carbon material and the carbon particles B. Furthermore, they are uniformly mixed with each other. Therefore, the humidity is maintained and the electronic conductivity is improved in an electrode described later, and the degradation of catalysts due to load fluctuation and start-stop operation is suppressed. Thus, the degradation of catalytic performance is expected to be suppressed even under low-humidification conditions.

The mixing of the raw material compound particles and polyvinylpyrrolidone in the (a) step and the mixing of the carbon material and the carbon particles B in the (c) step are performed by a solid kneading method. The solid kneading method is preferably a method in which mixing is uniformly performed. Examples of the solid kneading method include methods that use a roll-rotating mill, a ball mill, a small-size ball mill (bead mill), a medium-stirring mill, an air flow crusher, a mortar, an automatic kneading mortar, a crushing tank, and a jet mill.

Examples of the gas used in the non-oxidizing gas atmosphere in the (b) step include inert gases and hydrogen gas.

From the viewpoint of being relatively less expensive and easily available, the gas is preferably nitrogen gas, argon gas, or helium gas and more preferably nitrogen gas or argon gas. These gases may be used alone or in combination of two or more.

The relationship between the amounts of the carbon particles B and the carbon material used in the (c) step is not particularly limited as long as the molar ratio of each element to titanium taken as 1 is within the above ranges in the catalyst carrier obtained. The amount of the carbon material mixed with the carbon particles B is preferably 0.1 to 10 parts by mass, more preferably 0.1 to 5 parts by mass, and particularly preferably 0.4 to 3 parts by mass relative to 1 part by mass of the carbon particles B. When the relationship between the amounts of the carbon particles B and the carbon material is within the above range, the decrease in initial voltage under low-humidification conditions relative to the initial voltage under humidification conditions can be further suppressed.

The BET specific surface area of the titanium compound particles is preferably 50 to 300 m$^2$/g and more preferably 100 to 300 m$^2$/g from the viewpoint of the formation of a composite of the titanium compound particles and the carbon material and the dispersibility and atomization of a catalyst metal to be supported.

The DBP absorption of the carbon material is preferably 350 to 550 mL/100 g, more preferably 400 to 550 mL/100 g, and particularly preferably 450 to 550 mL/100 g from the viewpoint of electronic conductivity and mixing characteristics.

The BET specific surface area of the carbon material is preferably 700 to 1400 m$^2$/g, more preferably 800 to 1400 m$^2$/g, and particularly preferably 1000 to 1400 m$^2$/g from the viewpoint of the dispersibility and atomization of a catalyst metal to be supported.

The degree of graphitization of the carbon material is represented by the size Lc of a crystallite in a c-axis direction (hereafter also referred to as a "crystallite size").

The carbon material according to the present invention preferably has a crystallite size of 0.6 to 2.0 nm, more preferably 0.8 to 2.0 nm, and particularly preferably 0.8 to 1.6 nm. At a crystallite size of 0.6 nm or more, the degree of graphitization of carbon nanoparticles is high and thus high durability is easily achieved when the fuel cell is subjected to load fluctuation and start-stop operation. At a crystallite size of 2 nm or less, a large specific surface area is easily achieved and thus high catalytic performance is easily achieved.

The carbon material is also preferably a mixture of two or more carbon materials from the viewpoint of achieving both durability and initial performance. When the carbon material is a mixture of two carbon materials, namely a carbon material X and a carbon material Y, the BET specific surface area of the carbon material X is preferably 700 to 1400 m$^2$/g, more preferably 800 to 1400 m$^2$/g, and particularly preferably 900 to 1400 m$^2$/g. The BET specific surface area of the carbon material Y is preferably 100 to 500 m$^2$/g, more preferably 100 to 400 m$^2$/g, and particularly preferably 100 to 350 m$^2$/g. When the BET specific surface areas of the two carbon materials are within these ranges, the initial activity is high and high durability during start-stop operation is easily achieved.

When the carbon material is a mixture of the carbon material X and the carbon material Y, preferably, the amount of the carbon material X is 10 to 90 parts by mass and the amount of the carbon material Y is 10 to 90 parts by mass. More preferably, the amount of the carbon material X is 30 to 70 parts by mass and the amount of the carbon material Y is 30 to 70 parts by mass. Herein, the total amount of the carbon material X and the carbon material Y is 100 parts by mass.

The primary particle size of the carbon material Y having the above BET specific surface area is preferably 5 to 300 nm, more preferably 5 to 100 nm, and particularly preferably 5 to 50 nm from the viewpoint of achieving high catalytic performance. The primary particle size is an arithmetic mean of measured particle diameters of 50 or more carbon particles randomly chosen through observation of the carbon material Y with a transmission electron microscope.

The crystallite size of the carbon material Y having the above BET specific surface area is preferably 2.0 to 5.0 nm, more preferably 2.0 to 4.5 nm, and particularly preferably 2.5 to 4.5 nm. When the crystallite size is within the above range, high durability during start-stop operation is easily achieved.

The carbon material Y having the above physical properties is preferably formed of, among commercially available carbon materials, a carbon material constituted by carbon fine particles that are formed of amorphous carbon and have a chain structure. The carbon material Y can be obtained by heat-treating the commercially available carbon material in an inert or reducing gas atmosphere at 2200° C. to 3000° C. for 4 hours, for example. The inert or reducing gas atmosphere may be the above-described atmosphere.

An example of the carbon material Y that satisfies both the requirements of the primary particle size and the crystallite size is graphitized carbon black. Such graphitized carbon black can be obtained by heat-treating carbon black in an inert or reducing gas atmosphere, and has higher degree of graphitization than carbon black. When graphitized carbon black is contained in the catalyst carrier, high durability is easily achieved.

(Electrode Catalyst)

An electrode catalyst of the present invention is obtained by allowing catalyst metal particles to be supported on the catalyst carrier.

The metal of the catalyst metal particles is preferably at least one metal selected from the group consisting of platinum, palladium, ruthenium, gold, rhodium, iridium, osmium, iron, cobalt, nickel, chromium, zinc, and tantalum or an alloy formed of two or more metals selected from the foregoing group, and more preferably platinum or a platinum alloy from the viewpoint of easily achieving high catalytic performance.

When the alloy is a platinum alloy, the alloy component other than platinum is preferably at least one metal selected from the group consisting of palladium, ruthenium, gold, rhodium, iridium, osmium, iron, cobalt, nickel, chromium, zinc, and tantalum, more preferably at least one metal selected from the group consisting of palladium, ruthenium, iron, and cobalt, more preferably at least one metal selected from the group consisting of palladium and cobalt, and particularly preferably cobalt. When the metal or alloy is used as a catalyst metal component, good catalytic activity is easily achieved.

The average particle size of the catalyst metal particles is preferably 2 to 10 nm and more preferably 3 to 7 nm. Such an average particle size is preferred because good catalytic activity is achieved, the stability is also easily maintained in a fuel cell environment, and the durability is improved. The average particle size of the catalyst metal particles can be determined by the same method as that for the above-described average particle size of the titanium compound particles.

The content of the catalyst metal in the entire electrode catalyst is preferably 20 to 70 mass % and more preferably 30 to 50 mass %. The content is preferably within the above range because aggregation and coarsening of the catalyst metal are easily suppressed and the catalytic performance is easily improved.

The BET specific surface area of the electrode catalyst is preferably 200 to 800 $m^2/g$, more preferably 200 to 700 $m^2/g$, and particularly preferably 200 to 600 $m^2/g$ from the viewpoint of easily achieving high catalytic performance.

(Electrode)

The electrode catalyst can be processed into an ink by, for example, a method described in Examples below or a typical method. For example, by applying the obtained ink to an electrode substrate, a catalyst layer containing the electrode catalyst is formed on the surface of the electrode substrate. Thus, an electrode of the present invention can be obtained. That is, the electrode of the present invention includes an electrode substrate and a catalyst layer containing the electrode catalyst and formed on the electrode substrate. When the electrode of the present invention is used as an electrode for fuel cells, the electrode substrate preferably has a gas diffusion layer on its surface. The electrode of the present invention can be used as a cathode, an anode, or a cathode and an anode.

The electrode of the present invention can be used as a cathode for fuel cells. This provides a fuel cell in which the degradation of catalytic activity is suppressed under low-humidification conditions and which has high durability against load fluctuation and start-stop operation.

The electrode can also be used as an anode for fuel cells that use hydrogen fuel. In this case, the degradation of hydrogen oxidation activity can be suppressed under low-humidification conditions.

The electrode can also be used as an anode for fuel cells that use methanol fuel. In this case, the surface of the electrode has high wettability with methanol, and thus high methanol oxidation activity can be achieved.

(Membrane Electrode Assembly)

A membrane electrode assembly of the present invention includes a cathode and an anode with an electrolyte membrane disposed therebetween, and at least one of the cathode and the anode is the electrode of the present invention.

(Fuel Cell)

A fuel cell of the present invention includes the membrane electrode assembly. Thus, a fuel cell having high output and high durability can be provided.

EXAMPLES

Hereafter, the present invention will be more specifically described based on Examples of the present invention. They are merely examples of the present invention, and do not limit the present invention. The element quantitative analysis, the measurement of DBP absorption, the measurement of BET specific surface area, the observation with transmission electron microscope, and the measurement of crystallite size in Examples and Comparative Examples were performed by the following methods.

1. Element Quantitative Analysis

About 0.1 g of a sample was weighed and measured with an EMIA-110 manufactured by HORIBA, Ltd. to determine the quantity of carbon.

About 0.1 g of a sample was weighed, enclosed in a Ni-Cup, and then measured with an ON analyzer to determine the quantities of nitrogen and oxygen.

About 40 mg of a sample was weighed in a beaker. Aqua regia and then sulfuric acid were added thereto and pyrolysis was performed. The resulting pyrolysate was used to prepare a solution having a certain volume using ultrapure water, and then the resulting solution was appropriately diluted. A metal element was quantitatively determined using an ICP emission spectrometer (VISTA-PRO manufactured by SII).

2. Measurement of DBP Absorption

The DBP absorption was determined by measuring the amount of DBP added at 70% of the maximum torque and converting the amount of DBP to the DBP absorption per 100 g of a sample using an Absorptometer (manufactured by Branbender).

3. Measurement of BET Specific Surface Area

The BET specific surface area of a sample was determined with a Macsorb (manufactured by Mountech Co., Ltd.) using nitrogen gas. In the measurement, the pretreatment time was set to 30 minutes and the pretreatment temperature was set to 200° C.

4. Observation with Transmission Electron Microscope

The observation with a transmission electron microscope (TEM) was performed using an H9500 (acceleration voltage: 300 kV) manufactured by Hitachi, Ltd. A sample for observation was prepared by dispersing a sample powder in ethanol using ultrasonic waves to obtain a dispersion liquid and dropping the dispersion liquid onto a TEM observation grid.

5. Crystallite Size

A sample was subjected to powder X-ray diffraction using a Rotor flex manufactured by Rigaku Corporation. The X-ray diffraction was performed in the range of 10° to 90° using a Cu-Kα ray at 50 kW. Herein, the crystallite size was determined from peaks at 20°<2θ<30° on the basis of the Scherrer equation.

Example 1

(Production of Carbon Particles B(1))

To 5 g of commercially available titanium dioxide particles, 1.2 g of sufficiently pulverized carbon (Vulcan 72 manufactured by Cabot Corporation) was added. The resulting mixed powder was heated using a tube furnace in a nitrogen gas atmosphere at 1600° C. for 1 hour to obtain titanium carbonitride. The obtained titanium carbonitride was heat-treated at 800° C. for 1 hour while a nitrogen gas containing 1 vol % of oxygen gas was caused to flow, to obtain a titanium compound (1). The obtained titanium compound particles were pulverized with a ball mill.

Five grams of the titanium compound (1) and 5 g of polyvinylpyrrolidone (manufactured by NIPPON SHOKUBAI Co., Ltd.) were uniformly mixed with each other using a ball mill to obtain a solid mixed powder. The resulting powder was inserted into a tube furnace, heated to 700° C. in a hydrogen-nitrogen mixture gas atmosphere containing 4 vol % of hydrogen, and heat-treated at 700° C. for 1 hour to obtain titanium compound-carbon composite particles (hereafter also referred to as "carbon particles B(1)") in which carbon particles enclose titanium compound particles. The molar ratios of a carbon element, a nitrogen element, and an oxygen element to a titanium element taken as 1 in the carbon particles B(1) were 4.36, 0.04, and 1.96, respectively. FIG. 1 illustrates a transmission electron micrograph of the carbon particles B(1). In FIG. 1, (1) indicates particles of the titanium compound (1), and (2) indicates carbon constituting the carbon particles B(1).

(Production of Catalyst Carrier)

A commercially available carbon material (BET specific surface area: 1350 $m^2/g$, DBP absorption: 490 mL/100 g, crystallite size: 1.5 nm, a carbon material having a chain structure including a chain of carbon particles (hereafter also referred to as "carbon particles A(1)")) (hereafter also referred to as a "carbon material (1)") and the carbon particles B(1) were mixed with each other using a ball mill to obtain a catalyst carrier (1). The content of the carbon particles B(1) was set to 50 mass % relative to the total mass of the catalyst carrier (1). The molar ratios of a carbon element, a nitrogen element, and an oxygen element to a titanium element taken as 1 in the catalyst carrier (1) were 18.60, 0.04, and 1.96, respectively.

(Supporting of Catalyst Component)

To 1 L of pure water, 0.20 g of the catalyst carrier (1) was added, and ultrasonic vibration was performed using an ultrasonic cleaner for 30 minutes or longer. The resulting suspension was stirred for 30 minutes or longer while the liquid temperature was kept at 80° C. To the suspension, 40 mL of an aqueous solution containing 0.517 g (0.195 g in terms of platinum) of chloroplatinic acid hexahydrate and 0.083 g (0.020 g in terms of cobalt) of cobalt(II) acetate tetrahydrate was added dropwise over 1 hour. Herein, by appropriately adding a 1.0 mol/L aqueous sodium hydroxide solution dropwise, the pH of the suspension was kept at about 7.0. Then, the suspension was stirred for 3 hours while the temperature of the suspension was kept at 80° C. Then, 60 ml of an aqueous solution containing 0.583 g of sodium borohydride was added dropwise to the suspension over 30 minutes. Then, the suspension was stirred for 1 hour while the liquid temperature of the suspension was kept at 80° C. After the completion of the reaction, the suspension was cooled to room temperature. Filtration was performed to obtain a black powder, and the black powder was dried.

(Heat Treatment)

Figure 2:
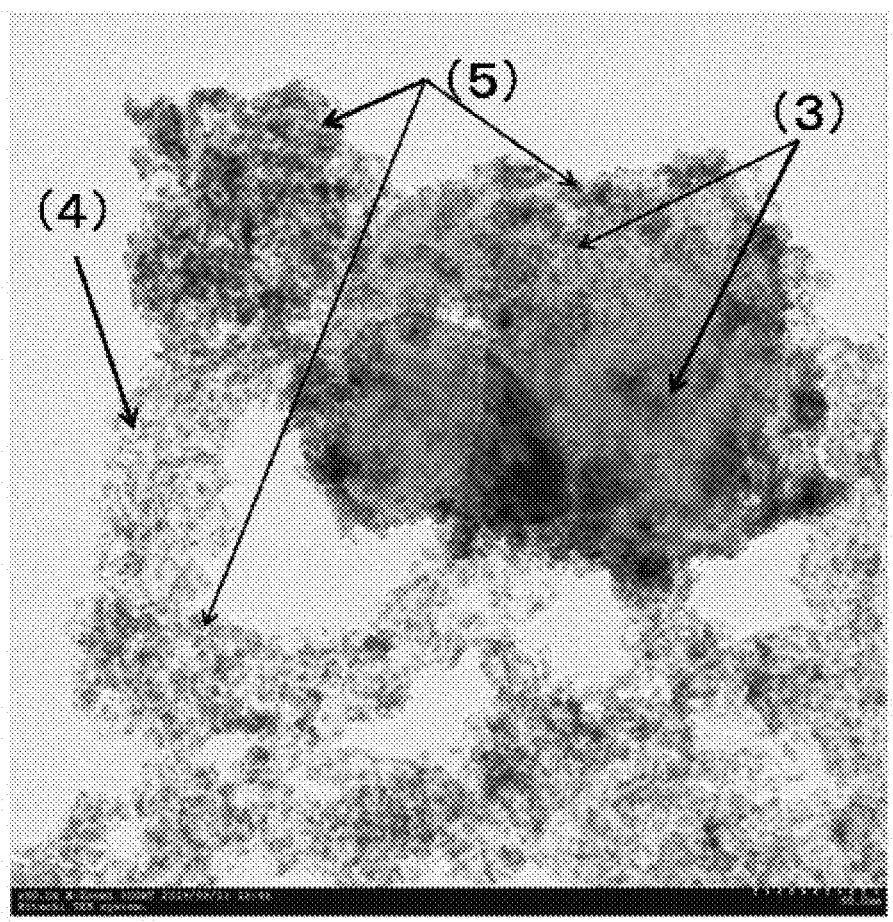
FIG. 2 is a transmission micrograph of an electrode catalyst (2) obtained in Example 1.

The black powder was inserted into a quartz tube furnace, heated to 700° C. at a heating rate of 10° C./min in a hydrogen-nitrogen mixture gas atmosphere containing 4 vol % of hydrogen gas, and heat-treated at 700° C. for 30 minutes. Consequently, a Pt—Co alloy was formed from platinum and cobalt, and thus an electrode catalyst (hereafter also referred to as an "electrode catalyst (1)") in which the alloy was supported as a catalyst metal was obtained. FIG. 2 illustrates a transmission electron micrograph of the electrode catalyst (1). In FIG. 2, (3) indicates the carbon particles B(1), (4) indicates the carbon particles A(1), and (5) indicates the catalyst metal (Pt—Co alloy). It can be confirmed from FIG. 2 that the catalyst metal is dispersedly supported on both the carbon particles B and the carbon particles A in a uniform manner in the electrode catalyst (1).

(Production and Evaluation of Fuel Cell)

(1) Preparation of Cathode Ink

Thirty-five milligrams of the electrode catalyst (1), 0.315 g of an aqueous solution (5% aqueous Nafion solution manufactured by Wako Pure Chemical Industries, Ltd.) containing 15.8 mg of a proton conducting material (Nafion (registered trademark)), 2.0 mL of pure water, and 2.0 mL of 2-propanol were weighed in a vial. The resulting mixture was subjected to ultrasonic irradiation in water with ice for 30 minutes to prepare a cathode ink (1).

(2) Production of Cathode

A gas diffusion layer (carbon paper (TGP-H-060 manufactured by Toray Industries, Inc.)) was immersed in acetone for 30 seconds to perform degreasing, dried, and then immersed in a 10% polytetrafluoroethylene (PTFE) aqueous solution for 30 seconds. The immersed object was dried at room temperature and then heated at 350° C. for 1 hour to obtain a gas diffusion layer (hereafter also referred to as a "GDL") in which the PTFE was dispersed in the carbon paper and which had water repellency. The cathode ink (1) was then applied onto the surface of a GDL having a size of 5 cm×5 cm at 80° C. using an automatic spraying device (manufactured by SAN-EI TECH Ltd.) to produce an electrode (hereafter also referred to as a "cathode (1)") including a cathode catalyst layer (1) formed on the GDL surface. In the cathode catalyst layer (1), the total amount of the electrode catalyst (1) per unit area was 0.20 $mg/cm^2$.

(3) Preparation of Anode Ink

To 50 ml of pure water, 0.6 g of a platinum-supported carbon catalyst (TEC10E70TPM manufactured by Tanaka Kikinzoku Kogyo) and 5 g of an aqueous solution containing 0.25 g of a proton conducting material (5% aqueous Nafion solution manufactured by Wako Pure Chemical Industries, Ltd.) were added. Mixing was performed with an ultrasonic disperser for 1 hour to prepare an anode ink (1).

(4) Production of Anode

As in the case of the production of the cathode, the anode ink (1) was applied onto the surface of a GDL having a size of 5 cm×5 cm at 80° C. using an automatic spraying device (manufactured by SAN-EI TECH Ltd.) to produce an electrode (hereafter also referred to as an "anode (1)") including an anode catalyst layer (1) formed on the GDL surface. In the anode catalyst layer (1), the total amount of the platinum-supported carbon catalyst per unit area was 1.00 $mg/cm^2$.

(5) Production of Membrane Electrode Assembly

A Nafion film (NR-212 manufactured by DuPont) was provided as an electrolyte membrane. The cathode (1) was provided as a cathode. The anode (1) was provided as an anode. A membrane electrode assembly (hereafter also referred to as an "MEA") for fuel cells in which the electrolyte membrane was disposed between the cathode (1) and the anode (1) was produced as follows. The electrolyte membrane was sandwiched between the cathode (1) and the anode (1), and they were subjected to thermocompression bonding using a hot pressing machine at 140° C. at 3 MPa over 7 minutes so that the cathode catalyst layer (1) and the anode catalyst layer (1) were brought in close contact with the electrolyte membrane to produce an MEA (1).

(6) Production of Single Cell

The MEA (1) was sequentially sandwiched between two sealing members (gaskets), between two separators with gas channels, between two current collectors, and between two rubber heaters. The periphery thereof was bolted so that a predetermined surface pressure (4 N) was achieved. Thus, a single cell (hereafter also referred to as a "single cell (1)") of a solid polymer fuel cell was produced (cell area: 25 $cm^2$).

(7) Evaluation of Current-Voltage Characteristics

In the evaluation of fuel cells under typical humidification conditions (hereafter also simply referred to as "humidification conditions"), the temperature of the single cell (1) was adjusted to 80° C., the temperature of an anode humidifier was adjusted to 80° C., and the temperature of a cathode humidifier was adjusted to 80° C. Then, hydrogen gas was supplied to the anode as a fuel and air was supplied to the cathode. The current-voltage (I-V) characteristics of the single cell (1) were evaluated. In the evaluation of fuel cells under low-humidification conditions, the temperature of the single cell (1) was adjusted to 65° C., the temperature of the anode humidifier was adjusted to 65° C., and the temperature of the cathode was adjusted to 65° C. without humidification, and the current-voltage (I-V) characteristics were evaluated.

(8) Potential Cycling Durability Test

The potential cycling durability test was performed under the following conditions.

The temperature of the single cell (1) was adjusted to 80° C., the temperature of the anode humidifier was adjusted to 80° C., and the temperature of the cathode humidifier was adjusted to 80° C. In this state, 2000 triangular wave potential cycles of 1.0 V-1.5 V and 1.5 V-1.0 V were performed while hydrogen gas was supplied to the anode and nitrogen gas was supplied to the cathode.

The current-voltage characteristics under the above-described humidification conditions were also evaluated before and after the 2000 potential cycles were performed in the potential cycling durability test. As shown in the formula below, the ratio (%) of voltages obtained from the current-voltage measurement at 0.2 A/cm² before and after the potential cycles is defined as a voltage retention rate.

Voltage retention rate=(Voltage after potential cycles)/(Voltage before potential cycles)×100

In the I-V characteristics of a fuel cell, the voltage at a certain current density is an index of the power generation performance of the fuel cell. That is, the higher the initial voltage, the higher the initial power generation performance of fuel cells, which means that the catalytic activity of an oxygen-reducing catalyst is high. Furthermore, as the voltage retention rate increases, the degradation of the power generation performance of fuel cells is suppressed, which means that the degradation of the catalytic activity of an oxygen-reducing catalyst is suppressed. In other words, the durability is high. Table 1 shows the initial voltage under the humidification conditions and the low-humidification conditions and voltage retention rate at 0.2 A/cm².

Example 2

A catalyst carrier (2) was produced by producing the carbon particles B(1) and mixing the carbon material (1) and the carbon particles B(1) in the same manner as in Example 1, except that the content of the carbon particles B(1) was set to 70 mass % relative to the total mass of the catalyst carrier (2). The molar ratios of a carbon element, a nitrogen element, and an oxygen element to a titanium element taken as 1 in the catalyst carrier (2) were 11.15, 0.04, and 1.96, respectively.

Subsequently, in the same manner as in Example 1, platinum and cobalt were supported on the catalyst carrier (2), the heat treatment was performed to form an alloy of platinum and cobalt, thereby producing an electrode catalyst (2), and a fuel cell was produced and evaluated. Table 1 shows the results.

Example 3

A catalyst carrier (3) was produced by producing the carbon particles B(1) and mixing the carbon material (1) and the carbon particles B(1) in the same manner as in Example 1, except that the content of the carbon particles B(1) was set to 30 mass % relative to the total mass of the catalyst carrier (3). The molar ratios of a carbon element, a nitrogen element, and an oxygen element to a titanium element taken as 1 in the catalyst carrier (2) were 30, 0.04, and 1.96, respectively.

Subsequently, in the same manner as in Example 1, platinum and cobalt were supported on the catalyst carrier (3), the heat treatment was performed to form an alloy of platinum and cobalt, thereby producing an electrode catalyst (3), and a fuel cell was produced and evaluated. Table 1 shows the results.

Example 4

A catalyst carrier (4) was produced in the same manner as in Example 1, except that a commercially available carbon material (2) (BET specific surface area: 563 m²/g, DBP absorption: 295 mL/100 g, crystallite size: 3.2 nm, a carbon material having a chain structure including a chain of carbon nanoparticles) was used instead of the carbon material (1). Herein, the content of the carbon particles B(1) was set to 30 mass % relative to the total mass of the catalyst carrier (4). The molar ratios of a carbon element, a nitrogen element, and an oxygen element to a titanium element taken as 1 in the catalyst carrier (5) were 24.33, 0.04, and 1.96, respectively.

Subsequently, in the same manner as in Example 1, platinum and cobalt were supported on the catalyst carrier (4), the heat treatment was performed to produce an electrode catalyst (4), and a fuel cell was produced and evaluated. Table 1 shows the results.

Example 5

A catalyst carrier (5) was produced in the same manner as in Example 1, except that a mixture (the mass ratio is carbon material (1):carbon material (3)=5:5, BET specific surface area: 760 m²/g) (hereafter also referred to as a "carbon material (4)") of a commercially available carbon material (BET specific surface area: 1350 m²/g) and a carbon material (3) (graphitized carbon black obtained by calcining commercially available carbon black in a $N_2$ atmosphere at 2200° C. for 4 hours, BET specific surface area: 170 m²/g, primary particle size: 40 nm, crystallite size: 3.5 nm, a carbon material having a chain structure including carbon nanoparticles) was used instead of the carbon material (1) in Example 1. The content of the carbon particles B(1) was set to 30 mass % relative to the total mass of the catalyst carrier (5).

Subsequently, in the same manner as in Example 1, platinum and cobalt were supported on the catalyst carrier (5), the heat treatment was performed to form an alloy of platinum and cobalt, thereby producing an electrode catalyst (5), and a fuel cell was produced and evaluated. Table 1 shows the results.

Example 6

A catalyst carrier (6) was produced in the same manner as in Example 1, except that a mixture (the mass ratio is commercially available carbon material:carbon material (3)=2:1, BET specific surface area: 955 m²/g) (hereafter also referred to as a "carbon material (5)") of a commercially available carbon material (BET specific surface area: 1350 m²/g) and the carbon material (3) was used instead of the carbon material (1) in Example 1. The content of the carbon particles B(1) was set to 70 mass % relative to the total mass of the catalyst carrier (6).

Subsequently, in the same manner as in Example 1, platinum and cobalt were supported on the catalyst carrier (6), the heat treatment was performed to form an alloy of platinum and cobalt, thereby producing an electrode catalyst (6), and a fuel cell was produced and evaluated. Table 1 shows the results.

Example 7

(Production of Carbon Particles B(2))

Carbon particles B(2) were produced using nitrogen gas containing 100 vol % of nitrogen instead of the hydrogen-nitrogen mixture gas containing 4 vol % of hydrogen in Example 1. A catalyst carrier (7) was produced in the same manner as in Example 1, except that the carbon particles B(2) were used instead of the carbon particles B(1). The content of the carbon particles B(2) was set to 50 mass % relative to the total mass of the catalyst carrier (7).

Subsequently, in the same manner as in Example 1, platinum and cobalt were supported on the catalyst carrier (7), the heat treatment was performed to form an alloy of platinum and cobalt, thereby producing an electrode catalyst (7), and a fuel cell was produced and evaluated. Table 1 shows the results.

Comparative Example 1

A catalyst carrier (8) was produced in the same manner as in Example 1, except that titanium dioxide used as a raw material for the carbon particles B(1) was used instead of the carbon particles B(1). The content of the titanium dioxide was set to 50 mass % relative to the total mass of the catalyst carrier (8). The molar ratios of a carbon element, a nitrogen element, and an oxygen element to a titanium element taken as 1 in the catalyst carrier (8) were 20.16, 0.0, and 2.0, respectively.

Subsequently, in the same manner as in Example 1, platinum and cobalt were supported on the catalyst carrier (8), the heat treatment was performed to form an alloy of platinum and cobalt, thereby producing an electrode catalyst (8), and a fuel cell was produced and evaluated. Table 1 shows the results.

Comparative Example 2

An electrode catalyst (9) was produced in the same manner as in Example 1, except that the carbon material (1) was used as a catalyst carrier (9) instead of the catalyst carrier (1).

Subsequently, a fuel cell was produced and evaluated in the same manner as in Example 1. Table 1 shows the results.

Comparative Example 3

An electrode catalyst (10) was produced in the same manner as in Example 1, except that the carbon particles B(1) were used as a catalyst carrier (10) instead of the catalyst carrier (1).

Subsequently, a fuel cell was produced and evaluated in the same manner as in Example 1. Table 1 shows the results.

Comparative Example 4

An electrode catalyst (11) was produced in the same manner as in Example 1, except that the carbon material (3) was used as a catalyst carrier (11) instead of the catalyst carrier (1) in Example 1.

Subsequently, a fuel cell was produced and evaluated in the same manner as in Example 1. Table 1 shows the results.

Comparative Example 5

(Production of Carbon Particles B(3))

Oxide-carbon composite particles (hereafter also referred to as "carbon particles B(3)") in which carbon encloses iron(III) oxide particles were produced in the same manner as in Example 1, except that commercially available iron(III) oxide particles (average particle size: 10 to 15 nm) were used instead of the titanium dioxide particles in Example 1.

A catalyst carrier (12) was produced in the same manner as in Example 1, except that the carbon particles B(3) were used instead of the carbon particles B(1). The content of the carbon particles B(3) was set to 50 mass % relative to the total mass of the catalyst carrier (12).

Subsequently, in the same manner as in Example 1, platinum and cobalt were supported on the catalyst carrier (12), the heat treatment was performed to form an alloy of platinum and cobalt, thereby producing an electrode catalyst (12), and a fuel cell was produced and evaluated. Table 1 shows the results.

TABLE 1

| | | | Catalyst carrier | | | |
| --- | --- | --- | --- | --- | --- | --- |
| | Electrode catalyst | Carbon material | Carbon particles B or titanium dioxide | BET specific surface area of carbon particles B or titanium dioxide ($m^2/g$) | DBP absorption of catalyst carrier (ml/100 g) | BET specific surface area of catalyst carrier ($m^2/g$) |
| Example 1 | Electrode catalyst (1) | Carbon material (1) | Carbon particles B(1) | 132 | 251 | 741 |
| Example 2 | Electrode catalyst (2) | Carbon material (1) | Carbon particles B(1) | 132 | 154 | 500 |
| Example 3 | Electrode catalyst (3) | Carbon material (1) | Carbon particles B(1) | 132 | 342 | 985 |
| Example 4 | Electrode catalyst (4) | Carbon material (2) | Carbon particles B(1) | 132 | 153 | 450 |
| Example 5 | Electrode catalyst (5) | Carbon material (4) | Carbon particles B(1) | 132 | 191 | 591 |
| Example 6 | Electrode catalyst (6) | Carbon material (5) | Carbon particles B(1) | 132 | 105 | 455 |
| Example 7 | Electrode catalyst (7) | Carbon material (1) | Carbon particles B(2) | 134 | 247 | 745 |
| Comparative Example 1 | Electrode catalyst (8) | Carbon material (1) | Titanium dioxide | 260 | 244 | 855 |
| Comparative Example 2 | Electrode catalyst (9) | Carbon material (1) | — | — | 490 | 1350 |

TABLE 1-continued

| | | | | | | |
|---|---|---|---|---|---|---|
| Comparative Example 3 | Electrode catalyst (10) | — | Carbon particles B(1) | 132 | 10 | 120 |
| Comparative Example 4 | Electrode catalyst (11) | Carbon material (3) | — | — | 50 | 170 |
| Comparative Example 5 | Electrode catalyst (12) | Carbon material (1) | Carbon particles B(3) | — | 245 | 702 |

| | Catalyst carrier | | | | | | |
|---|---|---|---|---|---|---|---|
| | Content of carbon particles B (mass %) | Ratio of carbon material to 1 part by mass of carbon particles B | Content of titanium compound particles (mass %) | Average particle size of titanium compound particles (nm) | Molar ratio of element to Ti (Fe) taken as 1 in catalyst carrier | | |
| | | | | | C | N | O |
| Example 1 | 50 | 1.0 | 40 | 47 | 18.60 | 0.04 | 1.96 |
| Example 2 | 70 | 0.43 | 60 | 47 | 11.15 | 0.04 | 1.96 |
| Example 3 | 30 | 2.3 | 25 | 47 | 30.00 | 0.04 | 1.96 |
| Example 4 | 30 | 2.3 | 25 | 47 | 24.33 | 0.04 | 1.96 |
| Example 5 | 30 | 2.3 | 25 | 47 | 28.84 | 0.04 | 1.96 |
| Example 6 | 70 | 0.43 | 60 | 47 | 10.54 | 0.04 | 1.96 |
| Example 7 | 50 | 1.0 | 40 | 47 | 20.45 | 0.05 | 1.96 |
| Comparative Example 1 | 50 | 1.0 | 50 | 7 | 20.16 | 0.00 | 2.00 |
| Comparative Example 2 | 0 | — | — | — | — | — | — |
| Comparative Example 3 | 100 | 0 | — | 47 | 4.30 | 0.04 | 1.96 |
| Comparative Example 4 | 0 | — | — | — | — | — | — |
| Comparative Example 5 | 50 | 1.0 | — | — | 18.49 | 0.04 | 1.48 |

| | Electrode catalyst | | | | Ratio of initial voltage under low-humidification conditions to initial voltage under humidification conditions (%) | Voltage retention rate (%) |
|---|---|---|---|---|---|---|
| | Catalyst metal particles | BET specific surface area of electrode catalyst (m²/g) | Initial voltage under humidification conditions (V) | Initial voltage under low-humidification conditions (V) | | |
| Example 1 | PtCo alloy | 375 | 0.778 | 0.725 | 93 | 65 |
| Example 2 | PtCo alloy | 275 | 0.772 | 0.719 | 93 | 67 |
| Example 3 | PtCo alloy | 490 | 0.781 | 0.726 | 93 | 62 |
| Example 4 | PtCo alloy | 247 | 0.767 | 0.696 | 91 | 72 |
| Example 5 | PtCo alloy | 302 | 0.782 | 0.734 | 94 | 80 |
| Example 6 | PtCo alloy | 224 | 0.77 | 0.723 | 94 | 82 |
| Example 7 | PtCo alloy | 376 | 0.776 | 0.724 | 93 | 65 |
| Comparative Example 1 | PtCo alloy | 432 | 0.771 | 0.705 | 91 | 55 |
| Comparative Example 2 | PtCo alloy | 653 | 0.766 | 0.68 | 89 | 0 |
| Comparative Example 3 | PtCo alloy | 66 | 0.443 | 0.403 | 91 | 3 |
| Comparative Example 4 | PtCo alloy | 84 | 0.737 | 0.651 | 88 | 96 |
| Comparative Example 5 | PtCo alloy | 340 | 0.757 | 0.594 | 78 | 36 |

As shown in Table 1, in Examples 1 to 7, the performance degradation caused when the operation under typical humidification conditions was changed to the operation under low-humidification conditions was suppressed compared with in Comparative Examples. The voltage retention rate was also high and high durability was achieved.

Furthermore, in Examples 1 to 3 and 5 to 7, high activity was exhibited under the typical humidification conditions and the low-humidification conditions. This may be because a carbon material having a BET specific surface area, a DBP absorption, and a crystallite size suitable in the present invention was selected. In particular, in Examples 5 and 6, the performance degradation caused when the operation under typical humidification conditions was changed to the operation under low-humidification conditions was small and high durability was exhibited. This may be because two carbon materials having different BET specific surface areas, primary particle sizes, and crystallite sizes were suitably selected and mixed.

INDUSTRIAL APPLICABILITY

In the electrode catalyst of the present invention, the degradation of the performance under low-humidification conditions is suppressed and high durability is exhibited. Therefore, a fuel cell having high power generation efficiency and high reliability is provided. The fuel cell can be used as a power supply for electric vehicles and a power supply for household cogeneration and the like.

The invention claimed is:

1. A catalyst carrier comprising a carbon material having a chain structure including a chain of carbon particles,
wherein the catalyst carrier contains a titanium compound-carbon composite particle in which carbon encloses a titanium compound particle, and
the number of moles of a carbon element, a nitrogen element, and an oxygen element relative to the number of moles of a titanium element in the catalyst carrier are more than 0 and 50 or less, more than 0 and 2 or less, and more than 0 and 3 or less, respectively.

2. The catalyst carrier according to claim 1, wherein the catalyst carrier has a dibutyl phthalate absorption of 150 to 450 mL/100 g.

3. The catalyst carrier according to claim 1, wherein a content of the titanium compound particle is 10 to 90 mass %.

4. The catalyst carrier according to claim 1, wherein the catalyst carrier has a BET specific surface area of 450 to 1100 m$^2$/g.

5. The catalyst carrier according to claim 1, wherein the titanium compound particle has an average particle size of 5 to 300 nm.

6. The catalyst carrier according to claim 1, wherein the carbon that encloses the titanium compound particle in the titanium compound-carbon composite particle is at least one carbon selected from amorphous carbon and graphitized carbon.

7. The catalyst carrier according to claim 1, wherein the carbon material is one selected from the group consisting of carbon black, graphitized carbon black, graphite, and porous carbon.

8. The catalyst carrier according to claim 1, wherein the carbon material is a mixture of two or more selected from the group consisting of carbon black, graphitized carbon black, graphite, and porous carbon.

9. The catalyst carrier according to claim 1, wherein the carbon material has a primary particle size of 5 to 300 nm.

10. An electrode catalyst in which a catalyst metal particle is supported on the catalyst carrier according to claim 1.

11. The electrode catalyst according to claim 10, wherein a metal of the catalyst metal particle is at least one metal selected from the group consisting of platinum, palladium, ruthenium, gold, rhodium, iridium, osmium, iron, cobalt, nickel, chromium, zinc, and tantalum, or an alloy formed of at least two metals selected from the foregoing group.

12. The electrode catalyst according to claim 10, wherein the electrode catalyst has a BET specific surface area of 200 to 800 m$^2$/g.

13. An electrode comprising an electrode substrate and a catalyst layer containing the electrode catalyst according to claim 10, the catalyst layer being formed on the electrode substrate.

14. A membrane electrode assembly comprising a cathode and an anode with an electrolyte membrane disposed therebetween,
wherein at least one of the cathode and the anode is the electrode according to claim 13.

15. A fuel cell comprising the membrane electrode assembly according to claim 14.

16. A method for producing the catalyst carrier according to claim 1, the method comprising:
a step of mixing a carbon material having a chain structure including a chain of carbon particles and a titanium compound-carbon composite particle in which carbon encloses a titanium compound particle,
wherein the number of moles of a carbon element, a nitrogen element, and an oxygen element relative to the number of moles of a titanium element in the titanium compound-carbon composite particle are more than 0 and 7 or less, more than 0 and 2 or less, and more than 0 and 3 or less, respectively.

17. The method for producing a catalyst carrier according to claim 16, wherein 0.1 to 10 parts by mass of the carbon material is mixed with 1 part by mass of the titanium compound-carbon composite particle.

18. The method for producing a catalyst carrier according to claim 16, wherein the carbon material has a BET specific surface area of 700 to 1400 m$^2$/g.

19. The method for producing a catalyst carrier according to claim 16, wherein the carbon material has a dibutyl phthalate absorption of 350 to 550 mL/100 g.

20. The method for producing a catalyst carrier according to claim 16, wherein the carbon material has a crystallite size of 0.6 to 2.0 nm.

21. The method for producing a catalyst carrier according to claim 16, wherein the carbon material is a mixture of a carbon material X having a BET specific surface area of 700 to 1400 m$^2$/g and a carbon material Y having a BET specific surface area of 100 to 500 m$^2$/g.

22. The method for producing a catalyst carrier according to claim 21, wherein the carbon material Y has a primary particle size of 5 to 300 nm and a crystallite size of 2.0 to 5.0 nm.

23. The method for producing a catalyst carrier according to claim 16, wherein the titanium compound-carbon composite particle is obtained by mixing polyvinylpyrrolidone and at least one compound selected from titanium oxycarbonitride, titanium oxynitride, and titanium oxide and heat-treating the mixture in a non-oxidizing gas atmosphere at 500° C. to 1100° C.

24. The method for producing a catalyst carrier according to claim 16, wherein the titanium compound particle has a BET specific surface area of 50 to 300 m$^2$/g.

* * * * *